July 5, 1932.  M. W. DEGNAN  1,865,458
HIGH PRESSURE VALVE
Filed Sept. 14, 1928   2 Sheets-Sheet 1

INVENTOR.
MATTHEW. WM. DEGNAN
BY Thos. E. Scofield
ATTORNEY

July 5, 1932.    M. W. DEGNAN    1,865,458
HIGH PRESSURE VALVE
Filed Sept. 14, 1928    2 Sheets-Sheet 2
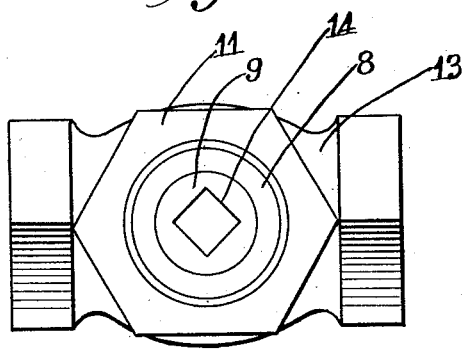
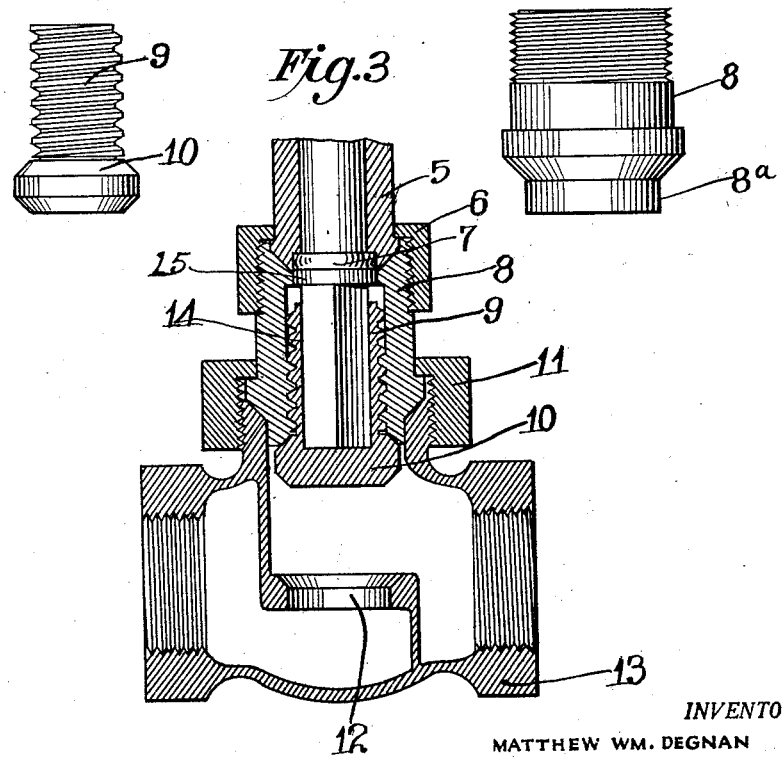
INVENTOR.
MATTHEW WM. DEGNAN
BY Thos. E. Scofield
ATTORNEY Patented July 5, 1932

1,865,458

UNITED STATES PATENT OFFICE

MATTHEW W. DEGNAN, OF KANSAS CITY, KANSAS

HIGH PRESSURE VALVE

Application filed September 14, 1928. Serial No. 305,959.

This invention relates to improvements in high pressure valves and refers more particularly to the valve bonnet assembly which is applicable not only to the valve shown, but is adaptable to any existing type of globe valve.

Among the salient objects of the invention are to provide a high pressure valve in which the valve proper has an upper and a lower seat, the lower seat functioning the valve opening through which fluids are passing, the upper valve seat in a wide open valve position sealing the valve body chamber from the bonnet so that the upper half of the valve bonnet assembly may be removed from the body without interrupting the operation of the valve and permitting replacement or repairs of the upper valve bonnet parts; to provide a valve bonnet assembly which has a removable stem socketed in the valve carrier and readily removable; to provide a valve bonnet assembly consisting of upper and lower bonnet elements which furnish a double seal against escaping fluids when the valve is in wide open position and a single seal in all positions; and to provide other novel features hereinafter explained.

Fig. 2 is a top view of the valve body with the upper bonnet assembly removed.

Fig. 3 is a sectional view of the valve with parts broken away and the valve in wide open position.

Fig. 4 is a detail of the valve disc carrier, showing the valve disc integral with the carrier.

Fig. 5 is a detail of the lower bonnet element.

Figures 1, 6:
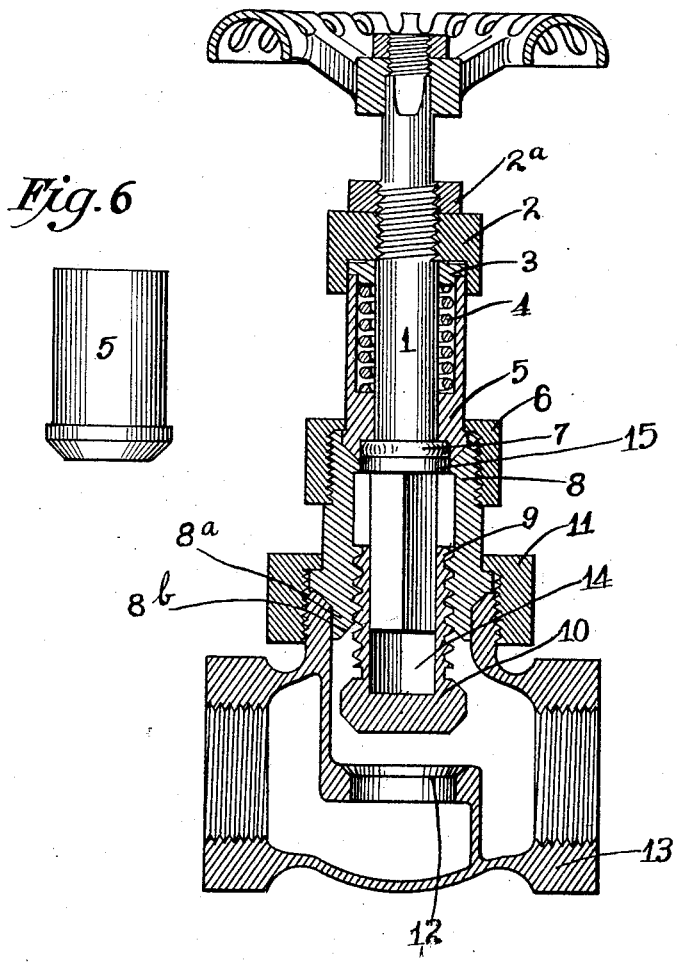
Fig. 1 is a sectional view of the valve, the valve being partially open.
Fig. 6 is a detail of the upper bonnet element.

Referring to the drawings, 1 is the valve stem, 2 is a cap nut which keeps the stem in alignment, 3 is a spring follower holding the compression spring 4 in the upper bonnet 5. 6 is a lock nut holding the upper bonnet in position by means of a shouldered portion on the lower end of the upper bonnet. 7 is a suitable joint-ring or gasket, 8 is the lower bonnet externally threaded at its upper portion to receive the lock nut 6 and internally threaded at its lower portion to receive the valve disc carrier 9. 10 is the valve disc which has an upper and a lower seat, and 11 is a lock nut which keeps the lower bonnet in place on the valve body 13. 14 is a squared hole in the valve disc carrier which furnishes a housing for the squared portion of the lower part of the stem and which permits the screwing of the valve disc carrier, whereby the valve is opened or closed. $8^a$ is an extended portion or sleeve at the lower end of the lower valve bonnet, and is internally machined as shown at $8^b$ at an angle to properly seat the valve disc when in a wide open position. The gasket 7 is supported on a stem collar 15 integral with the stem, the gasket being held in position by the upper bonnet 5 and compression spring 4.

The collar 15 is received in a recess in the inner end of the upper bonnet 5 and bears against the gasket 7 within said recess which takes the pressure exerted by the spring and also the pressure which banks up by leakage through the threads on valve carrier 9.

From an examination of the parts, the function of the valve and the removal of the bonnet assembly is obvious. Briefly, the stem is rotated without vertical movement, by the hand wheel mounted on the top of the stem, and this motion is transmitted through the squared lower portion of the valve stem 1 to the valve carrier 9. This rotation of the carrier due to the external threading of the carrier and internal threading of the lower end of the lower bonnet raises and lowers the valve disc to an open or closed position and to any intermediate position desired. When in closed position the lower seat of the valve disc is in pressure tight engagement with the seat 12 of the valve body 13. When in a wide open position the upper seat machined on the valve disc is in pressure tight engagement with the seat $8^b$ machined in the lower sleeve of the lower valve bonnet.

Assuming the valve in wide open position with the valve disc seated against the lower valve bonnet:

In this position the upper bonnet and stem may be disengaged from the lower valve bonnet by unscrewing the lock nut 6 and sliding the squared portion of the stem from the housing 14 in the carrier. This upper bonnet assembly may also be removed when the valve is entirely closed by disengaging the lock nut 6. This is permitted as the valve disc is seated and prevents the passage of fluids by the threads of the valve disc carrier.

The carrier may be separated from the valve disc in order that the valve disc may be removed and the seats of the disc renewed. As suggested, the lower sleeve 8ª of the bonnet 8 may also be removable for re-seating. The second seal afforded by the removable bonnet assembly is a seal between the upper and lower bonnets at the joint ring or gasket 7 which rests upon the stem collar 15. This seal is assured at all times due to the compression spring which imposes an upward pressure upon the valve stem. The collar 15 on the stem holds the gasket against the bottom of the upper bonnet and thus perfects the seal.

Functions of the upper lock nut 2 are, first, to keep the stem in alignment; second, to prevent inner movement of the stem and, third, it acts as a pressure retainer for the compression spring 4 seating against the follower 3 and holding the follower against the top of the spring.

Another important feature of the valve is that it affords a high pressure valve assembly which has entirely right handed threads on all screw joints. As is well known, a right handed thread can be made much tighter and more accurate than a left handed thread by a screw threading machine or by hand, and is more easily operated. Therefore the valve bonnet assembly having only right handed screws, as in the case of the present valve, affords the tightest possible screw threaded joints and is more easily operated.

The double sealing joints furnished by the seating of the valve disc against the lower bonnet and the use of a gasket in the joint between the upper and lower bonnets entirely eliminates the necessity for the usual pack joints in high pressure valves to prevent leakage around the stem.

It is obvious that the valve stem is removable independent of the operation of the valve in wide open or closed position. The stem is entirely smooth and has no keys, wings or fins which prevent its being removed from the valve bonnet assembly. The construction permits the use of cast elements and practically the entire valve made up on a lathe with machining and grinding required only at the valve seats.

The only two parts which are subjected to considerable wear on the valve are the valve seat and the seat on the lower valve bonnet. Any repair to the upper valve assembly or stem may be made, as suggested, by putting the valve in a wide open or closed position and removing the upper bonnet assembly from the valve body. As suggested, this bonnet assembly, including the upper and lower bonnets with the stem and its accompanying mechanism, is applicable to any suitable type of globe valve now in common use.

Another feature of this type of valve is its use in systems where wide open valves are to be used, such as steam heating systems in large buildings or in connection with header or line valves. In valves and systems of this character the valve can be inserted in the lines and be placed in a wide open position and the upper bonnet removed, and thereby prevent tampering by anyone except the person who is equipped with the upper valve bonnet assembly. This obviously would avoid difficulties encountered by operators where the system has to be continually checked to see that certain valves are always in a wide open position before the system is operated.

The valve is of sturdy construction and, as suggested, is particularly adapted for high pressure use. It is relatively cheap to manufacture and has substantially the same number of parts as the present existing high pressure globe valve. Furthermore, it is appreciated that certain minor changes may be made by altering the general characteristics of the elements used. Such changes are contemplated within the scope of the accompanying claims.

The compression spring in the upper bonnet may be removed and the packing may be applied instead.

I claim as my invention:

1. In a valve assembly a valve body having a seat, an internally threaded member secured to said valve body, said member having a seat, a unitary valve member having lower and upper valve surfaces for coaction with said valve body seat and said member seat respectively, said valve member having an integral external threaded extension for coaction with the internal threads on said member and being provided with an angular socket, a valve stem adapted to fit in said socket having an integral disc-shaped collar, a second member secured to said internally threaded member and housing the outer portion of said valve stem, a gasket, said second member having a recess adapted to receive said integral collar in bearing relation to said gasket, whereby to form a combined bearing and seal insuring tightness of the valve assembly under high pressure conditions.

2. In a valve assembly a valve body having a seat, an internally threaded member secured to said valve body, said member having a seat, a unitary valve member having lower and upper valve surfaces for coaction with said valve body seat and said member seat respectively, said valve member having an integral external threaded extension for coaction with the internal threads on said member and being provided with an angular socket, a valve stem adapted to fit in said socket having an integral disc-shaped collar, a second member secured to said internally threaded member and housing the outer portion of said valve stem, a gasket, said second member having a recess adapted to receive said integral collar in bearing relation to said gasket, whereby to form a combined bearing and seal insuring tightness of the valve assembly under high pressure conditions, a spring surrounding said valve stem, a follower for said spring, and means mounted on said valve stem for retaining the pressure exerted by said spring.

MATTHEW W. DEGNAN.